(12) United States Patent
Yamada et al.

(10) Patent No.: US 10,250,109 B2
(45) Date of Patent: Apr. 2, 2019

(54) MOLDED MOTOR WITH CONDUCTIVE PLATE TO REDUCE BEARING CORROSION

(71) Applicant: FUJITSU GENERAL LIMITED, Kanagawa (JP)

(72) Inventors: Masaki Yamada, Kanagawa (JP); Masanori Murakami, Kanagawa (JP); Tsugiyoshi Ono, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 570 days.

(21) Appl. No.: 14/347,362

(22) PCT Filed: Sep. 19, 2012

(86) PCT No.: PCT/JP2012/073941
§ 371 (c)(1),
(2) Date: Mar. 26, 2014

(87) PCT Pub. No.: WO2013/047295
PCT Pub. Date: Apr. 4, 2013

(65) Prior Publication Data
US 2014/0232216 A1    Aug. 21, 2014

(30) Foreign Application Priority Data

Sep. 30, 2011    (JP) ................. 2011-218632

(51) Int. Cl.
*H02K 11/00*    (2016.01)
*H02K 11/40*    (2016.01)
*H02K 5/08*    (2006.01)
*H02K 5/15*    (2006.01)
*H02K 5/173*    (2006.01)

(52) U.S. Cl.
CPC .............. *H02K 11/40* (2016.01); *H02K 5/08* (2013.01); *H02K 11/00* (2013.01); *H02K 5/15* (2013.01); *H02K 5/1732* (2013.01)

(58) Field of Classification Search
CPC .... H02K 5/167; H02K 5/1672; H02K 5/1675; H02K 5/1677; H02K 5/173;
(Continued)

(56) References Cited

U.S. PATENT DOCUMENTS 4,798,984 A * 1/1989 Suzuki .................. H02K 11/40
310/239
6,768,243 B1 * 7/2004 Yamazaki .............. H02K 5/145
310/239
(Continued)

FOREIGN PATENT DOCUMENTS

EP    2355311 A1    8/2011
JP    55-010368    7/1978
(Continued)

OTHER PUBLICATIONS

Yasuaki Miyota, Electric Motor, Oct. 9, 1987, Hitachi, Ltd, JP 62159143 (English Translation).*
(Continued)

*Primary Examiner* — Bernard Rojas
*Assistant Examiner* — Alexander A Singh
(74) *Attorney, Agent, or Firm* — Rankin, Hill & Clark LLP

(57) ABSTRACT

The metal conductive plate 60 electrically connecting the bracket 51 on the output side and the bracket 52 on the counter-output side includes: a first abutting portion 61 formed on one end and abutted on a side of the bearing house 520 on the counter-output side, the first abutting portion 61 warping in a direction away from the case 20; a second abutting portion 62 formed on the other end and abutted on an inner side of the bracket 51 on the output side press-fitted on the case 20; and a conductive sleeve 63 connecting the first abutting portion 61 and the second abutting portion 62. The conductive plate 60 and the case 20 include a holding
(Continued)

unit for holding a state in which the first abutting portion 61 is abutted on the side of the bearing house 520 on the counter-output side.

16 Claims, 8 Drawing Sheets

(58) Field of Classification Search
CPC .. H02K 5/1732; H02K 5/1735; H02K 5/1737; H02K 5/08; H02K 5/15; H02K 5/04; H02K 5/225; H02K 11/00
USPC .................................. 310/43, 71, 89, 90, 91
See application file for complete search history.

(56) References Cited

U.S. PATENT DOCUMENTS

| | | |
|---|---|---|
| 2008/0042499 A1 | 2/2008 | Okada |
| 2011/0068646 A1 | 3/2011 | Terakubo et al. |
| 2011/0234024 A1* | 9/2011 | Hasegawa ................ H02K 5/08 310/43 |
| 2011/0234026 A1 | 9/2011 | Watanabe |

FOREIGN PATENT DOCUMENTS

| | | |
|---|---|---|
| JP | 61-017848 | 2/1986 |
| JP | 62-159143 | 10/1987 |
| JP | 2007-020348 | 1/2007 |
| JP | 2011-067069 | 3/2011 |

OTHER PUBLICATIONS

Extended European Search Report dated Mar. 3, 2016 issued in the corresponding European patent application No. 12834916.4.
International Search Report dated Dec. 18, 2012 filed in PCT/JP2012/073941.
Chinese Office Action dated Aug. 13, 2015 for the corresponding Chinese Patent Application No. 201280045263.3, and its English translation thereof.

* cited by examiner (a)

(b)

(a)

(b)

MOLDED MOTOR WITH CONDUCTIVE PLATE TO REDUCE BEARING CORROSION

TECHNICAL FIELD

The present invention relates to an inner rotor type molded motor.

BACKGROUND ART

In a conventional molded motor, an output-side bracket and a counter-output side bracket are electrically connected by a conductive tape as an electrical connection member (see Patent Document 1, for example). The conductive tape used in the molded motor is positioned between the output-side bracket and the counter-output-side bracket. The conductive tape is affixed to the side of a case molded with a molding resin. In each of the output-side bracket and the counter-output-side bracket, a bearing house for housing bearings is formed.

In the molded motor, because the output-side bracket and the counter-output-side bracket are electrically connected by the conductive tape, the outer races of the bearings housed in the bearing houses have the same potential. Thus, no current flows in the bearings, so that the development of electric corrosion in the bearings can be prevented. Further, because the conductive tape is affixed to the side of the case, there is no need to embed the electrical connection member in the molding resin. Accordingly, a highly sophisticated technique is not required for molding. The conductive tape can be easily affixed to the side of the case. However, the conductive tape could be cut or peeled off during transportation of the molded motor, or when mounting the molded motor on an electric unit, such as an air conditioner or a deodorization device. The conductive tape may also be peeled by deterioration over time.

CITATION LIST

Patent Literature

Patent Document JP-A-2007-20348 (page 4, FIG. 1)

SUMMARY OF INVENTION

Problems to be Solved by the Invention

In view of the above problems, an object of the present invention is to provide a molded motor in which the electrical connection member is disposed on the case of the molded motor. In the molded motor, the electrical connection member can be prevented from being cut or peeled when electrically connecting the output-side bracket and the counter-output-side bracket, and the yield of the material for forming the electrical connection member can be increased.

Solutions to the Problems

To solve the above-mentioned problem, a molded motor in the present invention includes: a stator including a bottomed cylindrical case molded with a molding resin; a rotor rotatably disposed on a radially inner sick of the stator; a bearing supporting an output side and a counter-output side of an output rotary shaft of the rotor; a conductive bracket including a bearing house housing the bearing and disposed on each of the output side and the counter-output side of the case; and a metal conductive plate electrically connecting the bracket on the output side and the bracket on the counter-output side. The conductive plate includes: a first abutting portion formed on one end and abutted on a side of the bearing house on the output side or the counter-output side, the first abutting portion warping in a direction away from the case, a second abutting portion formed on the other end and abutted on an inner side of the bracket on the output side or the counter-output side press-fitted on the case, and a conductive sleeve connecting the first abutting portion and the second abutting portion; and the conductive plate and the case include a holding unit for holding a state in which the first abutting portion is abutted on the side of the bearing house.

Effects of the Invention

In the molded motor according to the present invention, the output-side bracket and the counter-output-side bracket are electrically connected by the conductive plate. Thus, the outer races of the bearings housed in the bearing houses have the same potential, so that no current flows in the bearings. Accordingly, the development of electric corrosion in the bearings can be prevented. The holding unit formed in the conductive plate and the case holds the state in which the first abutting portion is abutted on the side of the bearing house on the output side or the counter-output side. Thus, the first abutting portion can be prevented from being cut or peeled as the conductive tape. The conductive plate is formed as a band including the conductive sleeve. Thus, the yield of the material for forming the conductive plate can increased.

DESCRIPTION OF EMBODIMENTS

Figure 1:
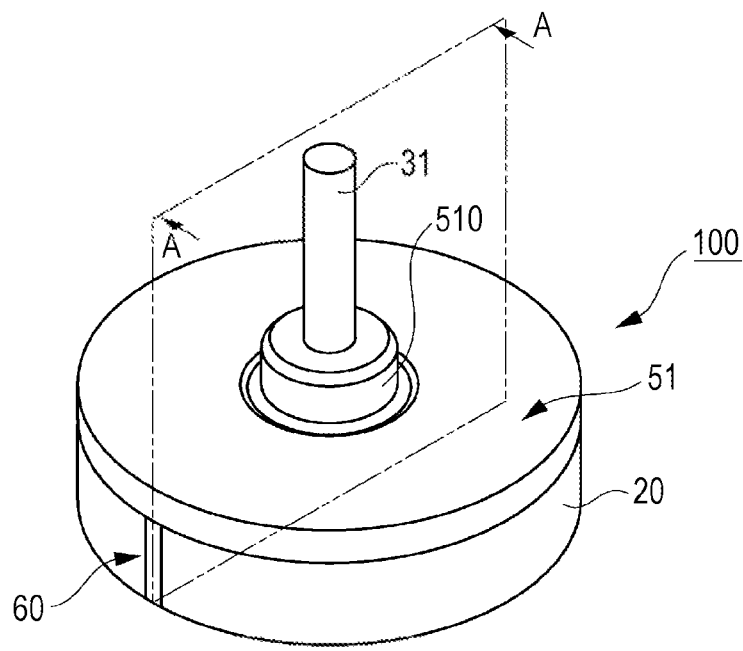
FIG. 1 is a diagram illustrating a molded motor according to the present invention, (a) being to schematic perspective view from the output side, and (b) being a schematic perspective view from the counter-output side.
Figure 1:
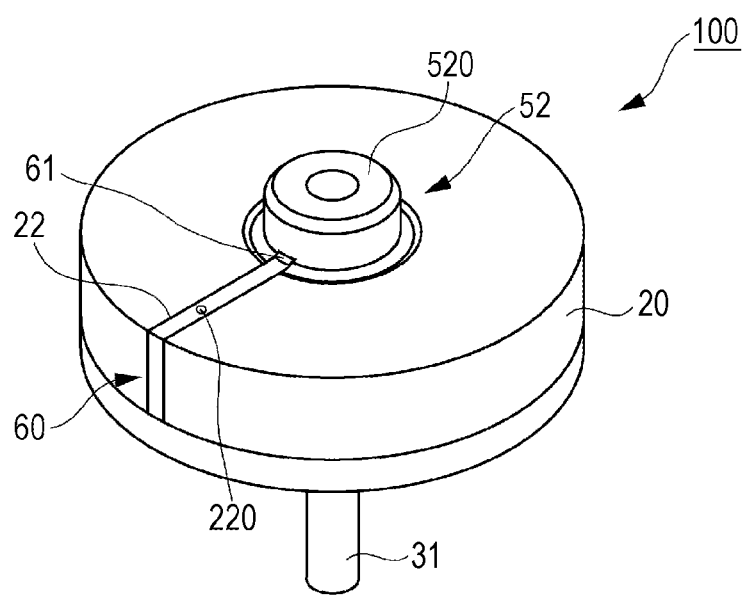
Figure 2:
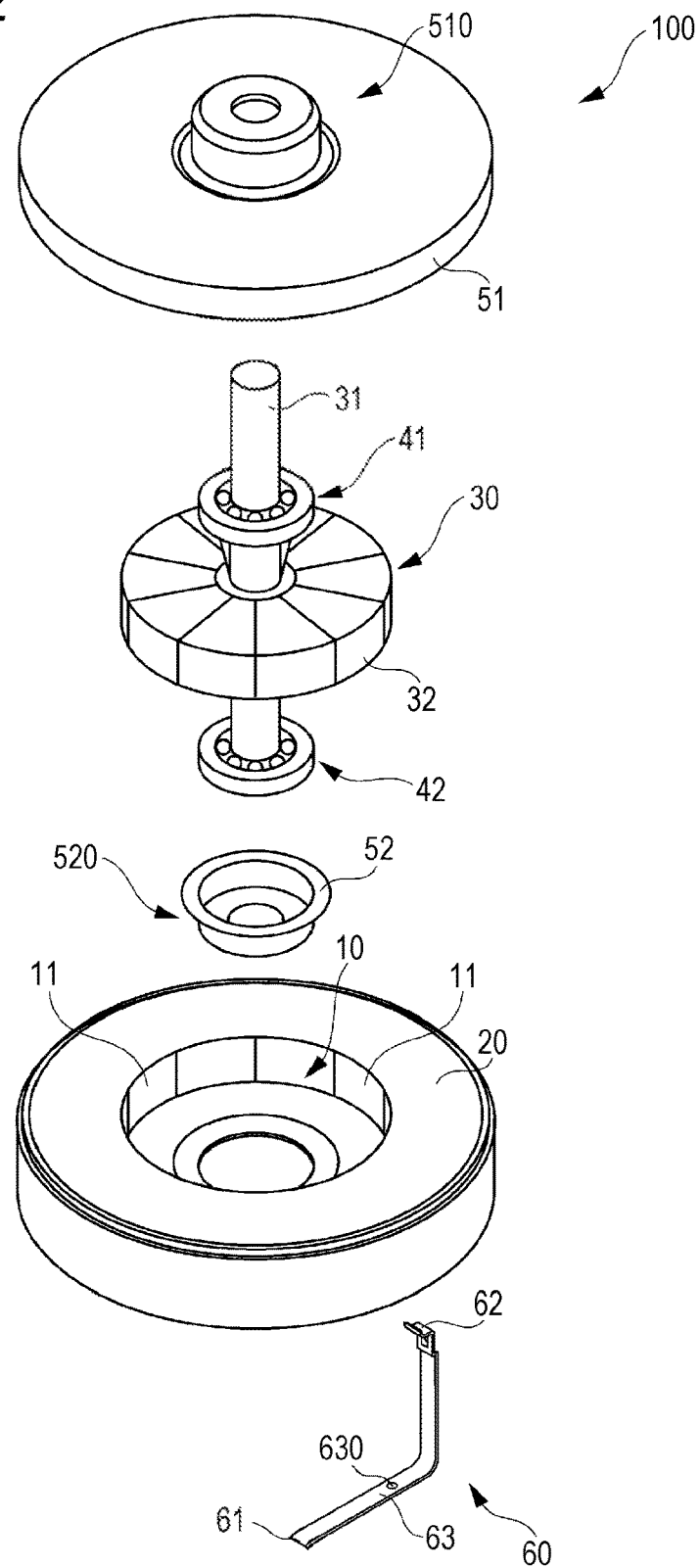
FIG. 2 is a schematic exploded perspective view of the molded motor according to the present invention.
Figure 3:
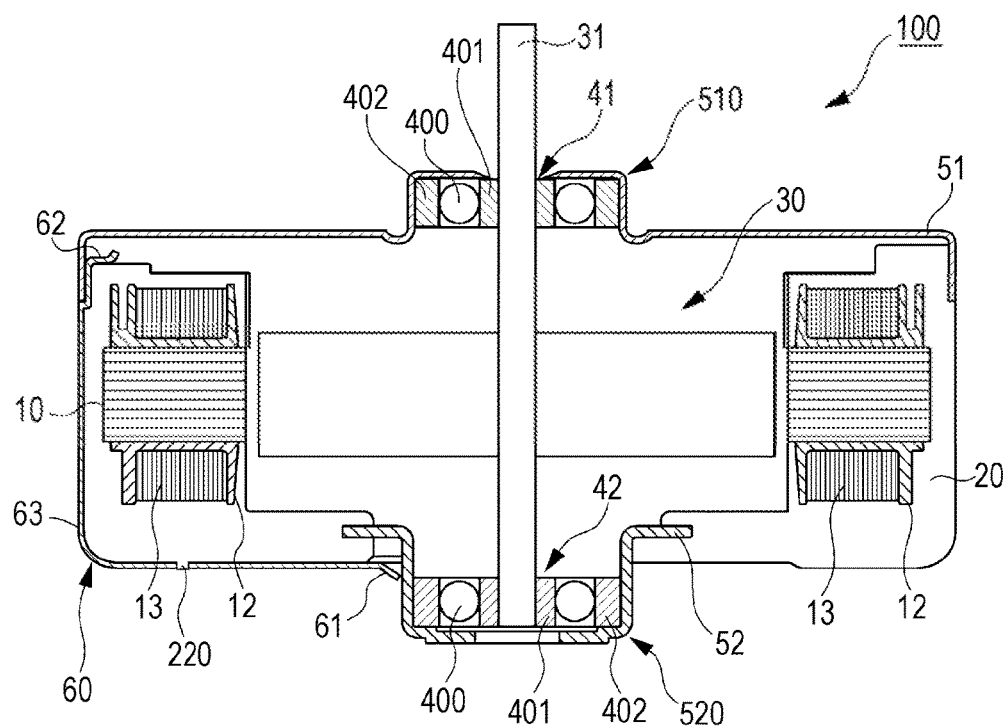
FIG. 3 is a schematic cross sectional view of the molded motor according to the present invention taken along A-A of FIG. 1(a).

In the following, an embodiment of the present invention will be described in detail with reference to the attached drawings. FIGS. 1 to 10 are diagrams illustrating a molded motor according to the present embodiment. As illustrated in FIGS. 1 to 3, a molded motor 100 is provided with a stator core 10, a case 20, a rotor 30, an output-side bearing 41, counter-output-side bearing 42, an output-side bracket 51, a counter-output-side bracket 52, and a conductive plate 60.

The stator core 10 includes stacked layers of steel plates. The stator core 10 is provided with an annular yoke portion and a plurality of teeth 11 extending from the yoke portion radially inwardly. An insulator 12 is formed by pre-molding the stator core 10. Via the insulator 12, a winding wire 13 is wound on the teeth 11. The stator core 10 with the winding wire 13 wound thereon is molded with a molding resin except for an inner peripheral surface, whereby the cylindrical case 20 is formed. Thus, a stator is formed. The insulator 12 may be separately formed and attached to the stator core 10, rather than being pre-molded on the stator core 10. On the counter-output side of the case 20, a metal bracket 52 made of a galvanized steel plate is integrally embedded. The bracket 52 on the counter-output side includes a bearing house 520 housing the counter-output-side bearing 42 that is exposed on the case 20.

The rotor 30 is provided with an output rotary shaft 31 and a permanent magnet 32 with a plurality of magnetic poles. The magnetic poles of the permanent magnet 32 are arranged around the output rotary shaft 31 at regular intervals, with the N and S poles alternately reversed between the adjacent magnetic poles, which are integrated with the output rotary shaft 31. The permanent magnet 32 may be formed as a ferrite bonded magnet by forming a mixture of resin material and ferrite magnetic material and then magnetizing. The rotor 30 is housed in the stator core 10 more inside than the internal periphery of the stator core 10, while facing each other via a predetermined gap. The permanent magnet 32 is not limited to the above example. A rare-earth magnet may be used instead of the ferrite magnet, and a sintered magnet may be used instead of the bonded magnet.

The output rotary shaft 31 is rotatably axially supported via the output-side bearing 41 and the counter-output-side bearing 42. As the output-side bearing 41 and the counter-output-side hearing 42, ball bearings are used. The ball bearings include balls 400 as rolling elements, an inner race 401, and an outer race 402.

Referring to FIGS. 1, 2, and 3, the output-side bearing 41 is housed in an output-side hearing 510. The bearing house 510 is formed in the metal output-side bracket 51 made of the galvanized steel plate. The output-side bracket 51 is fitted on the side of the case 20 on the output side.

Referring to FIG. 1, one end of the conductive plate 60 is abutted on the counter-output-side bearing house 520. The other end of the conductive plate 60 is abutted on the output-side bracket 51. In the following, the conductive plate 60 will be described in detail. Referring to FIGS. 1, 2, and 3, the conductive plate 60 is made of a band of metal plate having electrical conductivity, spring property, and rigidity. The conductive plate 60 is formed of stainless material having such properties. The conductive plate 60 may be formed of any material as long as the material has the properties of electrical conductivity, spring property, and rigidity; examples include as iron, steel, brass, and phosphor bronze. The conductive plate 60 includes a first abutting portion 61 formed on the one end, a second abutting portion 62 formed on the other end, and a conductive sleeve 63 connecting the first abutting portion 61 and the second abutting portion 62. The conductive sleeve 63, as illustrated in FIG. 3, is bent at an intermediate point, so that the conductive sleeve 63 is substantially L-shaped as a whole. Specifically, the conductive sleeve 63 is bent along the end face of the case 20 on the counter-output side and a side of the case 20. The end face of the case 20 on the counter-output side and the side of the case 20 include a groove portion 22 for housing the conductive plate 60.

Referring to FIGS. 1 and 3, the counter-output-side bearing house 520 is formed as a bottomed cylinder by press working, for example. Inside the counter-output-side bearing house 520, the bearing 42 is housed. On the outside of the bearing house 520, the first abutting portion 61 formed on the one end of the conductive plate 60 is abutted, the first abutting portion 61 being warped in a direction away from the case 20. On the other hand, the second abutting portion 63 formed on the other end of the conductive plate 60 is abutted on the inside of the output-side bracket 51, with the output-side bracket 51 press-fitted on the side of the case 20 on the output side.

Figure 4:
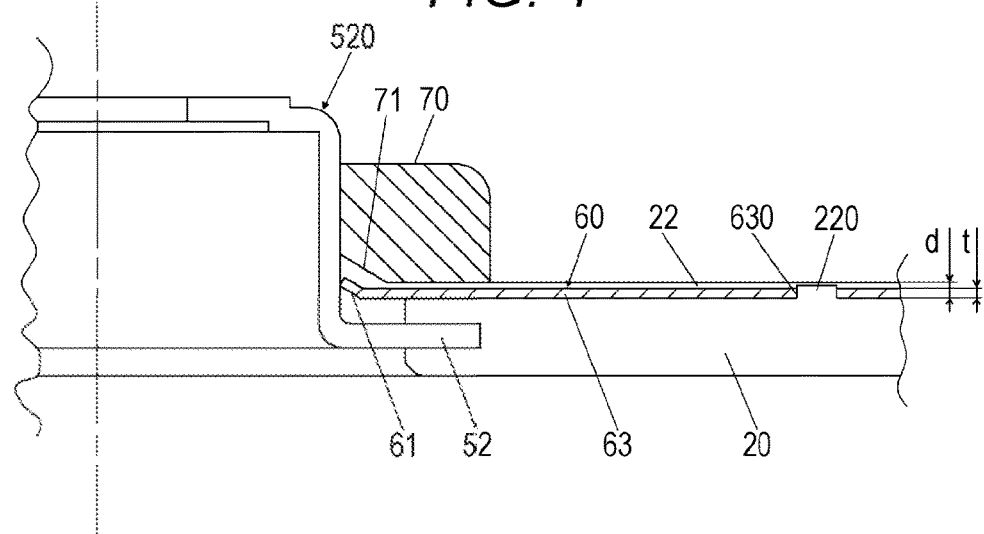
FIG. 4 is an enlarged cross sectional view of a first abutting portion and areas around a bolding unit.
Figure 5:
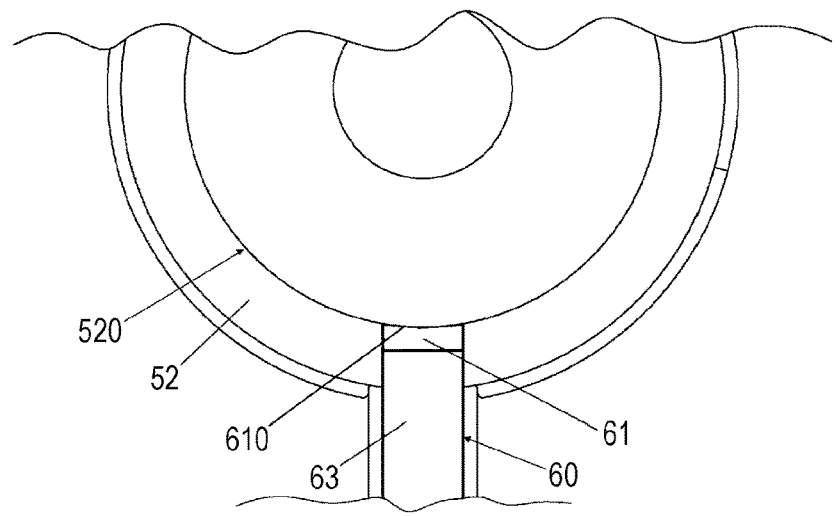
FIG. 5 is a diagram illustrating areas around the first abutting portion, (a) being a schematic enlarged plan view corresponding to FIG. 4, and (b) being a schematic enlarged plan view of a modification of the first abutting portion illustrated in (a).
Figure 5:
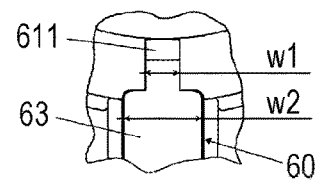

FIGS. 4 and 5 show a portion around the first abutting portion 61. In FIGS. 4 and 5(*a*), the first abutting portion 61 of the conductive plate 60 is abutted on the outer side of the counter-output-side bearing house 520. The conductive sleeve 63 is housed in the groove portion 22. Because the conductive plate 60 is housed in the groove portion 22, the conductive plate 60 can be positioned circumferentially with respect to the case 20. On the outer periphery of the counter-output-side bearing house 520, a vibration isolation rubber 70 is disposed. The vibration isolation rubber 70 decreases vibrations transmitted from the molded motor to the air conditioner, for example, in which the molded motor 100 is mounted. The vibration isolation rubber 70 includes a beveled portion 71 formed at the corner portion adjoining the first abutting portion 61. Because the vibration isolation rubber 70 has the beveled portion 71, the chances of the first abutting portion 61 becoming caught by the vibration isolation rubber 70 and thus rising when the vibration isolation rubber 70 is mounted on the outer periphery of the bearing house 520, for example, are eliminated. Thus, contact failure between the outer side of the bearing house 520 and the first abutting portion 61 can be prevented. Because the first abutting portion 61 is covered by the vibration isolation rubber 70, the first abutting portion 61 can be prevented from coming into contact with the finger of an operator, for example. The vibration isolation rubber 70 is also mounted an the outer periphery of the output-side hearing house 510 (not shown).

The conductive plate 60 and the case 20 include a holding unit. The holding unit holds the state in which the first abutting portion 61 is abutted on the outer side of the counter-output-side bearing house 520. The holding unit includes a first holding portion disposed on the conductive plate 60 and a second holding portion disposed on the case 20 which are combined with each other. The conductive sleeve 63 of the conductive plate 60 includes a hole 630 as the first holding portion. The hole 630 is formed on the radially outer side than the first abutting portion 61. The groove portion 22 formed in the end face of the case 20 on the counter-output side includes a protrusion 220 as the second holding portion. The hole 630 is press-fitted on the protrusion 220. Because the hole 630 is press-fitted on the protrusion 220, the state in which the first abutting portion 61 is abutted on the outer side of the counter-output-side bearing house 520 while the conductive sleeve 63 is housed in the groove portion 22 is held. The conductive plate 60 has a thickness t on the order of 0.4 mm, for example. The groove portion 22 has a depth d greater than the thickness t of the conductive plate 60 and the same as the height of the protrusion 220. Thus, the conductive plate 60 does not protrude from the end face of the case 20 on the counter-output side or the side of the case 60. Accordingly, the finger and the like of the operator is not caught by the conductive plate 60 when approaching the groove portion 22 for example, so that the detachment of the conductive plate 60 from the groove portion 22 can be prevented.

Referring to FIG. 5(a), the first abutting portion 61 includes a front-end portion 610 formed in an arc shape along the outer side of the counter-output-side bearing house 520. Because the front-end portion 610 of the first abutting portion 61 is formed in an arc shape, the abutting area between the front-end portion 610 and the outer side of the counter-output-side bearing house 520 is increased, whereby the front-end portion 610 can be reliably abutted. The shape of the front-end portion 610 of the first abutting portion 61 is not limited to the arc shape and may include a linear shape.

FIG. 5b) shows a modification of the first abutting portion 61. In FIG. 5(a), the width of the first abutting portion 61 and the width of the conductive sleeve 63 are the same. On the other hand, in FIG. 5(b), the first abutting portion 611 has a width w1 smaller than a width w2 of the conductive sleeve 63. Namely, the first abutting portion 611 is narrower than the conductive sleeve 63 circumferentially. Because the first abutting portion 611 is narrower circumferentially, the first abutting portion 611 is more readily deformable. Thus, the hole 630 can be more easily positioned with the protrusion 220 in the state in which the first abutting portion 611 is abutted on the outer side of the counter-output-side bearing house 520. Accordingly, the hole 630 can be more easily press-fitted on the protrusion 220.

Figure 6:
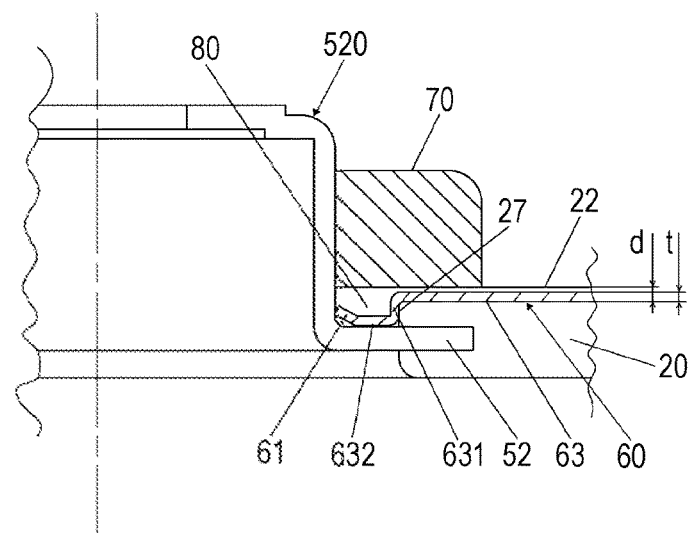
FIG. 6 is an enlarged cross sectional view of the first abutting portion and areas around the holding unit.
Figure 7:
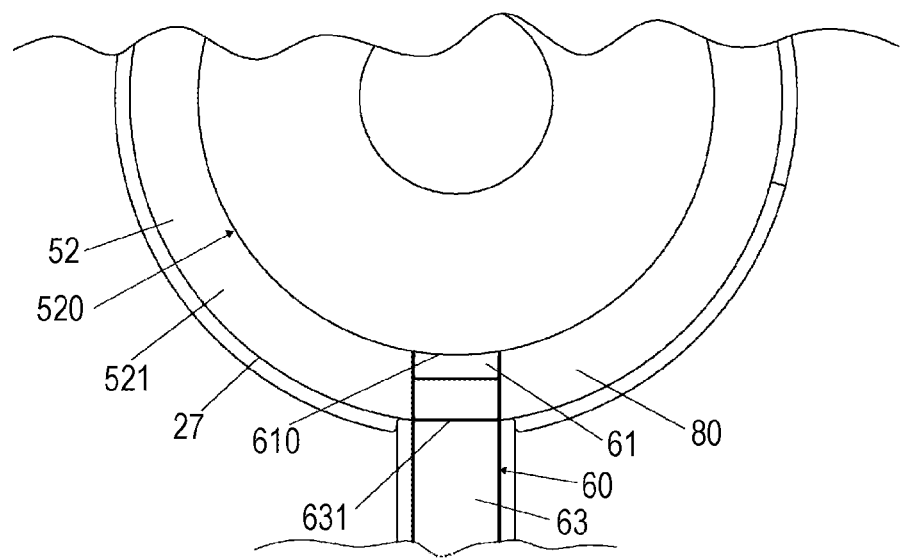
FIG. 7 is a diagram illustrating the first abutting portion and areas around the holding unit, (a) being a schematic enlarged plan view corresponding to FIG. 6, and (b) being a schematic enlarged plan view of a modification of the first abutting portion illustrated in (a).
Figure 7:
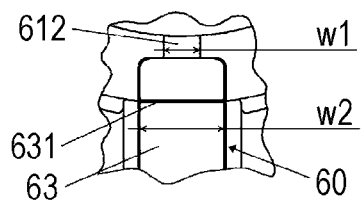

FIGS. 6 and 7 are enlarged views around the first abutting portion 61 according to another embodiment. Portions similar to those of the embodiment illustrated in FIGS. 4 and 5 are designated with similar reference signs and their description will be omitted. FIGS. 6 and 7(a), the conductive plate 60 includes the first holding portion. The first holding portion includes a bent portion 631 and the first abutting portion 61. The bent portion 631 is formed in the conductive sleeve 63 on the radially outer side than the first abutting portion 61. The conductive plate 60 also includes a groove portion 80 as the second holding portion. The groove portion 80 is formed by combining the counter-output-side bearing house 520 and the case 20. On the radially inner side of the end face of the case 20 on the counter-output side, a stepped portion 27 is formed. The stepped portion 27 is formed at a position facing the outer side of the counter-output-side bearing house 520. Because of the stepped portion 27, the annular groove portion 80 is formed on the radially outer side of the counter-output-side bearing house 520. Specifically, the groove portion 80 is formed between the outer side of the bearing house 520 and the stepped portion 27. Meanwhile, the conductive plate 60 includes a convex portion 632 press-fitted in the groove portion 80. The convex portion 632 includes the bent portion 631 and the first abutting portion 61. Specifically, the bent portion 631 is bent along the stepped portion 27. The first abutting portion 61 is connected on the radially inner side of the bent portion 631. The first abutting portion 61 is bent in the opposite direction from the direction in which the bent portion 631 is bent. As illustrated in FIG. 6, the cross sectional shape of a part of the conductive plate 60 from the bent portion 631 to the first abutting portion 61 is formed in as substantially convex shape. In the part of the conductive plate 60, the convex portion 632 is formed. When the bent portion 631 and the first abutting portion 61 (i.e., the convex portion 632 of the conductive plate 60) are press-fitted in the groove portion 80, the abutted state of the first abutting portion 61 with respect to the outer side of the counter-output-side bearing house 520 is held.

FIG. 7(b) illustrates a modification of the first abutting portion 61 according to the other embodiment. In FIG. 7(a) the width of the first abutting portion 61 and the width of the conductive sleeve 63 are the same. On the other hand, in FIG. 7(b), the width w1 of the first abutting portion 612 is smaller than the width w2 of the conductive sleeve 63. Namely, the first abutting portion 612 is narrower than the conductive sleeve 63 circumferentially. Because the first abutting portion 612 is circumferentially narrower, the first abutting portion 612 is more readily deformable. Thus, the convex portion 632 can be more easily positioned with the groove portion 80 in the state in which the first abutting portion 611 is abutted on the outer side of the counter-output-side bearing house 520. Accordingly, the convex portion 632 can be more easily press-fitted in the groove portion 80.

Figure 8:
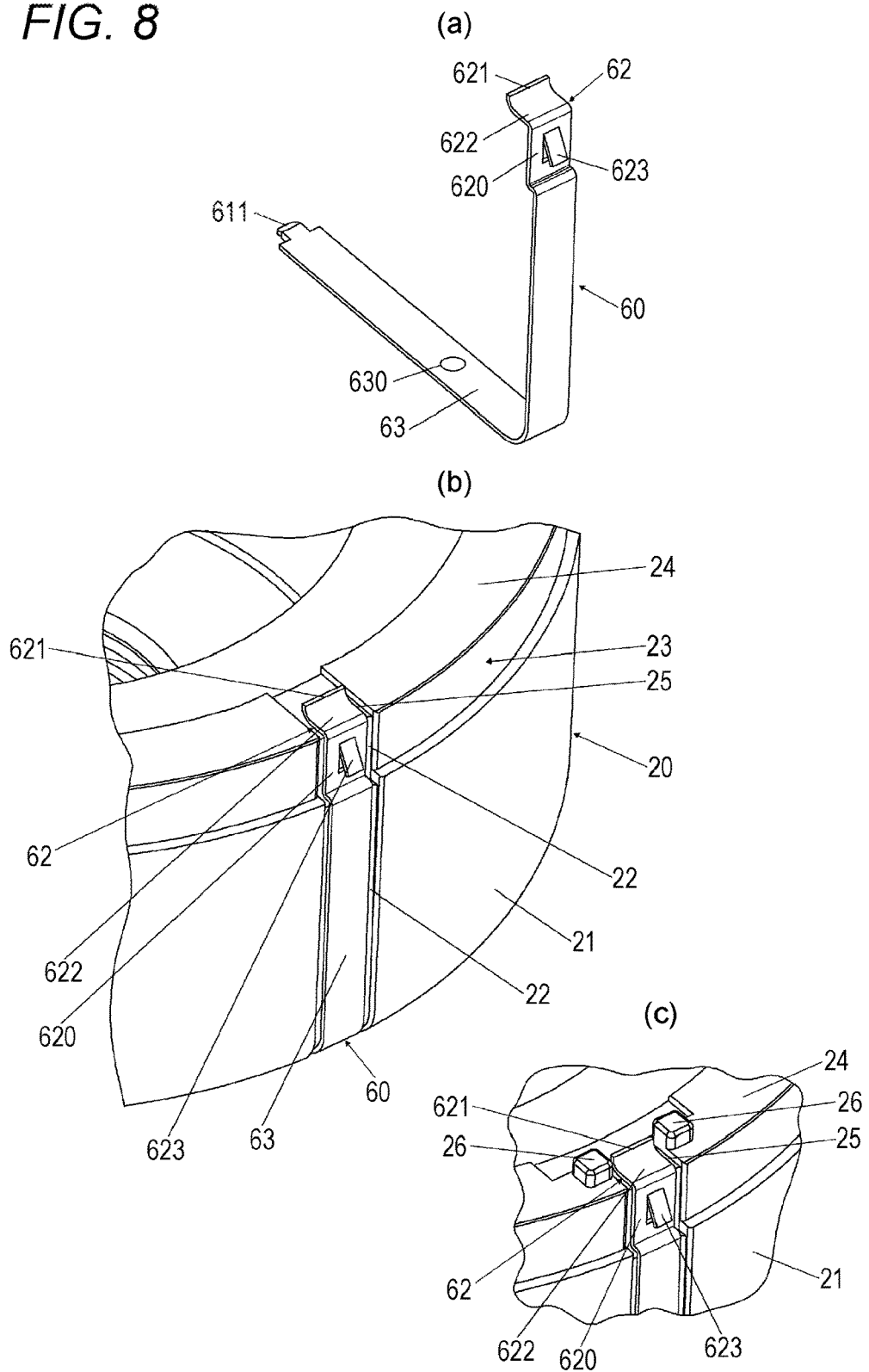
FIG. 8 is a diagram illustrating a conductive plate and areas around a second abutting portion, (a) being a perspective view of the conductive plate for illustrating the second abutting portion, (b) being an enlarged perspective view of the second abutting portion of (a) housed in a groove portion, and (c) being an enlarged perspective view of a modification around the grove portion of (b).

FIG. 8 illustrates the conductive plate 60 and areas around the second abutting portion 62 abutted on the output-side bracket 51. FIGS. 8(b) and 8(c) show the state in which the output-side bracket 51 is removed from the case 20. In FIGS. 8(a) and 8(b), a side 21 of the case 20 has a step 23 on the output side. The output-side bracket 51 is press-fitted in the step 23. The conductive sleeve 63 of the conductive plate 60 is housed in the groove portion 22 formed in the side 21 of the case 20. The groove portion 22 is also formed from the step 23 to an output side end face 24 of the case 20. In the output side end face 24, a groove 25 is formed in a direction perpendicular to the side 21.

Figure 10:
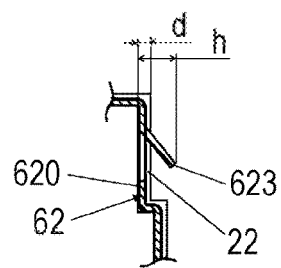
FIG. 10 is an enlarged schematic cross-sectional view of the case, illustrating the relationship between a cut-raised portion of the second abutting portion and the groove portion of the case.

The second abutting portion 62 includes a joint portion 620 and a front-end portion 621. The joint portion 620 is joined with the groove portion 22 formed from the step 23 to the output side end face 24 of the case 20. The front-end portion 621 is the portion adjoining the joint portion 620 on the front end side that is bent along the output side end face 24 of the case 20 and that is raised from the output side end face 24 in a direction along the groove portion 22. Between the joint portion 620 and the front-end portion 621, a locking portion 622 locked on the output side end face 24 is provided. The front-end portion 621 and the locking portion 622 of the second abutting portion 62 are housed in the groove 25 formed in the output side end face 24. The front-end portion 621 is warped in a direction along the groove portion 22. Thus, when housing the front-end portion 621 in the groove 25 of the output side end face 24 while sliding along the groove portion 22 formed from the step 23 of the case 20 to the output side end face 24, the force applied to the front-end portion 621 can be let go in the direction along the groove portion 22. Accordingly, the front-end portion 621 is easily movable. The joint portion 620 of the second abutting portion 62 includes a cut-raised portion 623. The cut-raised portion 623, which is joined with the inner peripheral surface of the output-side bracket 51, is cut and raised in such a manner as to protrude from the groove portion 22 toward the radially outer side of the case 20. Namely, the cut-raised portion 623, as illustrated in FIG. 10, is cut and raised to a height h greater than the depth d of the groove portion 22. Because of the cut-raised portion 623 formed as described above, when the joint portion 620 is joined with the groove portion 21 and the cut-raised portion 623 is joined with the output-side bracket 51, the abutted state of the second abutting portion 62 with respect to the output-side bracket 51 can be made more reliable. According to the present embodiment, the abutted state of the second abutting portion 62 with respect to the output-side bracket 51 is made more reliable by forming the cut-raised portion 623 in the joint portion 620. However, the joint portion 620 may be joined with the inner peripheral surface of the output-side bracket 51 while omitting the cut-raised portion 623.

FIG. 8(c) illustrates a modification around the groove portion 22. In FIG. 8(a), the output side end face 24 of the case 20 does not have anything on either side of the groove 25 on the side away from the side 21. On the other hand, in FIG. 8(c), protrusions 26 are formed on both sides of the groove 25 on the output side end face 24 for protecting the front-end portion 621. Sides of the protrusions 26 are formed continuously with sides of the groove 25. Because of the protrusions 26 formed on both sides of the groove 25, the front-end portion 621 of the second abutting portion 62 housed in the groove 25 can be protected, although the front-end portion 621 is raised from the output side end face 24. For example, even if the finger of the operator is placed near the front-end portion 621, the finger is not caught by the front-end portion 621 because of the protrusions 26 protecting the front-end portion 621, so that the front-end portion 621 can be prevented from being detached from the groove 25. The protrusions 26 may be formed on only one side of the groove 25, or on the side of the output side end face 24 closer to the side 21.

Figure 9:
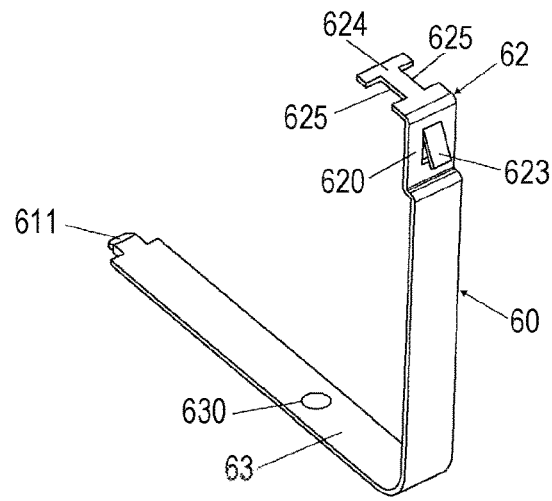
FIG. 9 is a diagram illustrating the conductive plate and areas around the second abutting portion, (a) being a perspective view illustrating a modification of the second abutting portion of FIGS. 8(*a*) and (*b*) being an enlarged perspective view of the second abutting portion of (a) housed in the groove portion.
Figure 9:
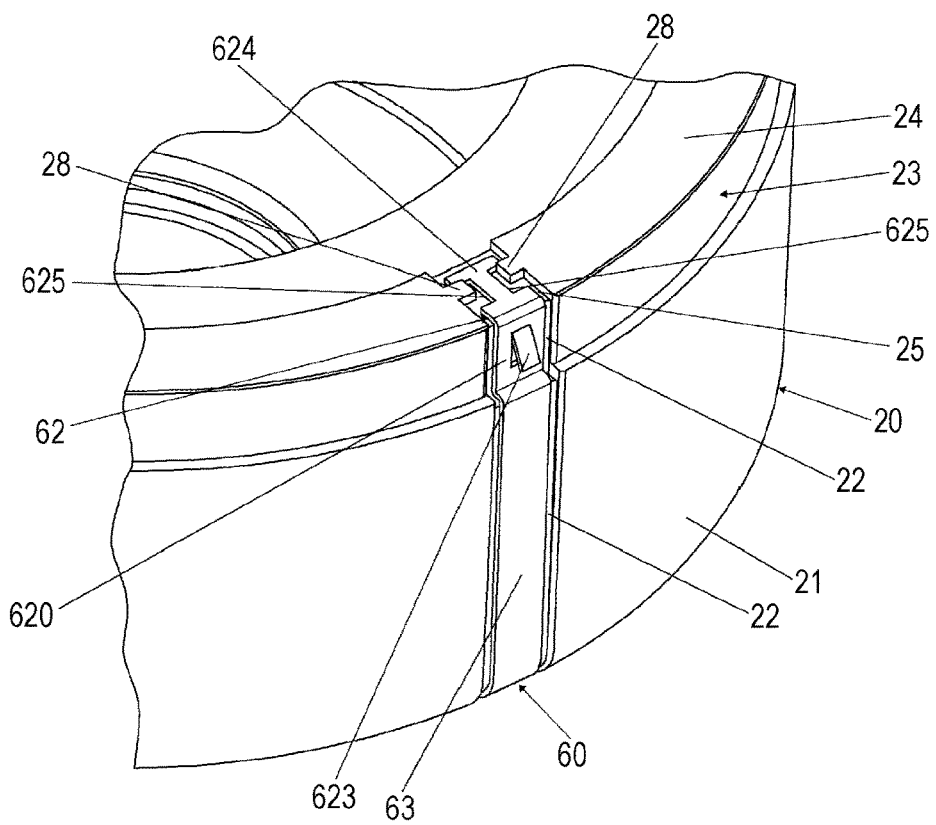

FIG. 9 illustrates the conductive plate 60 and areas around the second abutting portion 62 abutted on the output-side bracket 51 according to another embodiment. FIG. 9(b) illustrates the state in which the output-side bracket 51 is removed from the case 20. Portions similar to those of the embodiment of FIG. 8 are designated with similar reference signs and their description will be omitted. In FIGS. 9(a) and 9(b), the groove portion 22 is formed from the step 23 to the output side end face 24 of the case 20. The groove 25 is formed in the output side end face 24 in a direction perpendicular to the side 21. On the sides of the groove 25, a pair of convex portions 28 is formed, facing in a circumferential direction of the output side end face 24. Meanwhile, the portion of the second abutting portion 62 closer to the front end than the joint portion 620 is bent along the output side end face 24 of the case 20 and includes a locking portion 624 locked on the output side end face 24. The locking portion 624 includes a pair of cut-out portions 625 formed in a concave shape corresponding to the pair of convex portions 28 formed in the groove 25. The pair of cut-out portions 625 formed in the locking portion 624 is caught by the pair of convex portions 28 formed on the groove 25. Thus, the locking portion 624 is prevented from being detached from the groove 25.

In the molded motor 100 configured as described above, a current is caused to flow through the winding wire 13 in accordance with the rotational position of the rotor 30 that is detected by a position detection sensor which is not shown, whereby a rotating field is produced in the stator. Thus, the rotor 30 can be rotated together with the output rotary shaft 31. While the molded motor 100 provided with a position detection sensor has been described, the molded motor may be of a sensor-less type. The molded motor 100 can be used as a motor for driving a blast fan mounted in an air conditioner, for example. When the molded motor 100 is used in an indoor unit, the output rotary shaft 31 is attached with a cross flow fan. When the molded motor 100 is used in an outdoor unit, the output rotary shaft 31 is attached with a propeller fan.

Figure 11:
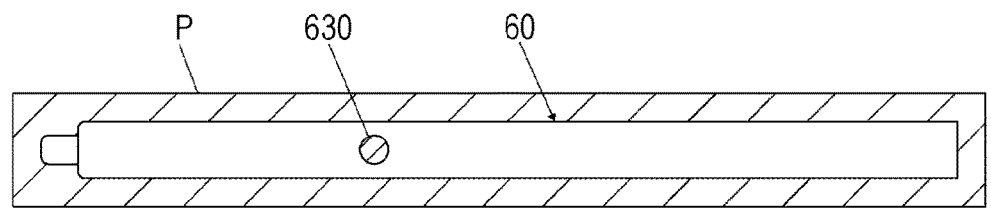
FIG. 11 is a diagram illustrating an effect of press-punching the conductive plate.

In the molded motor 100 according to the present invention as described above, the output-side bracket 51 and the counter-output-side bracket 52 are electrically connected by the conductive plate 60, and the outer race 402 of the bearing 41 housed in the output-side bearing house 510 and the outer race 402 of the bearing 42 housed in the counter-output-side bearing house 520 have the same potential. Thus, no current flows in the output-side bearing 41 or the counter-output-side bearing 42, whereby the development of electric corrosion in the output-side bearing 41 and the counter-output-side bearing 42 can be prevented. The holding unit formed in the conductive plate 60 and the case 20 holds the state in which the to abutting portion 61 is abutted on the outer side of the counter-output-side bearing house 520. Thus, the cutting or peeling as in the case of the conductive tape can be prevented. The conductive plate 60 is a band-shaped member including the conductive sleeve 63. Thus, as illustrated in FIG. 11, when the conductive plate 60 is press-punched out of a metal plate P, wasted material can be decreased. Accordingly, the yield of the material for forming the conductive plate 60 can be increased.

In the molded motor 100 according to the present embodiment, the first abutting portion 61 is formed on one end of the conductive plate 60, and the second abutting portion 62 is formed on the other end. However, the present invention is not limited to such embodiment. The second abutting portions 62 may be formed on both ends of the conductive plate 60, and the steps 23 may be formed on the side of the case 20 on the output side and the counter-output side, so that the second abutting portions 62 can be respectively abutted on the insides of the output-side bracket 51 and the counter-output-side bracket 52 press-fitted on the steps 23 of the case 20. In the molded motor 100 according to the present embodiment, the first abutting portion 61 of the conductive plate 60 is abutted on the outer side of the counter-output-side bearing house 520. However, the present invention is not limited to such embodiment. The first abutting portion 61 may be abutted on the outer side of the output-side hearing house 510. In the molded motor 100 according to the present embodiment, as the holding unit for holding the abutted state of the first abutting portion 61 of the conductive plate 60, the conductive plate 60 housed in the groove portion 22 formed in the side 21 of the case 20 and the end face of the case 20 on the counter-output side may be threadedly fixed onto the groove portion 22. Further, in the molded motor 100 according to the present embodiment, the groove portion 22 may be formed only in the step 23 and not in the side 21 of the case 20 or the end face of the case 20 on the counter-output side.

DESCRIPTION OF REFERENCE SIGNS

10 Stator core
11 Teeth
12 Insulator
13 Winding wire

20 Case
21 Side
22 Groove portion
220 Protrusion
23 Step
24 Output side end face
25 Groove
26 Protrusion
27 Stepped portion
28 Convex portion
30 Rotor
31 Output rotary shaft
32 Permanent magnet
400 Ball
401 Inner race
402 Outer race
41 Output-side bearing
42 Counter-output-side bearing
51 Output-side bracket
510 Output-side bearing house
52 Counter-output-side bracket
520 Counter-output-side bearing house
60 Conductive plate
61 First abutting portion
610 Front-end portion
611 First abutting portion
612 First abutting portion
62 Second abutting portion
620 Joint portion
621 Front-end portion
622 Locking portion
623 Cut-raised portion
624 Locking portion
625 Cut-out portion
63 Conductive sleeve
630 Hole
631 Bent portion
632 Convex portion
70 Vibration isolation rubber
71 Beveled portion
80 Groove portion
d Depth groove 22
t Thickness of conductive plate 60
w1 Width of first abutting portion 611 and first abutting portion 612
w2 Width of conductive sleeve 63
h Raised height of cut-raised portion 623
P Metal plate

The invention claimed is:

1. A molded motor comprising:
a stator including a bottomed cylindrical case molded with a molding resin;
a rotor rotatably disposed on a radially inner side of the stator;
a bearing supporting an output side and a counter-output-side of an output rotary shaft of the rotor;
a conductive bracket including a bearing house housing the bearing and disposed on each of the output side and the counter-output side of the case; and
a metal conductive plate electrically connecting the bracket on the output side and the bracket on the counter-output side, wherein:
the conductive plate includes
a first abutting portion formed on one end, the first abutting portion comprising a front-end portion that is abutted on an outer side of a cylinder portion of the bearing house on the output side or the counter-output side, the front-end portion warping in a direction away from the case,
a second abutting portion formed on the other end and abutted on an inner side of the bracket on the output side or the counter-output side press-fitted on the case, and
a conductive sleeve connecting the first abutting portion and the second abutting portion;
the conductive plate and the case include a holding unit for holding the front-end portion of the first abutting portion in a state in which the front-end portion is bent to be raised toward obliquely upward and is abutted on the outer side of the cylinder portion of the bearing house;
the conductive plate is disposed on an outer surface of the case;
the holding unit includes a first holding portion in the conductive plate and a second holding portion in the case, the first holding portion including a hole in the conductive sleeve, the second holding portion including a protrusion that is a part of the case, the protrusion being positioned away from the bearing house;
the protrusion is inserted in the hole such that the state in which the front-end portion is abutted on the outer side of the cylinder portion of the bearing house is held; and
the first abutting portion has a width smaller than a width of the conductive sleeve.

2. The molded motor according to claim 1, wherein the case includes a groove portion housing the conductive plate.

3. The molded motor according to claim 2, wherein the groove portion has a depth greater than a thickness of the conductive plate.

4. The molded motor according to claim 2, wherein the second abutting portion includes a cut-raised portion cut and raised in such a manner as to protrude from the groove portion toward the radially outer side of the case.

5. The molded motor according to claim 1, wherein the conductive plate is in direct contact with the outer surface of the case.

6. The molded motor according to claim 1, wherein a front-end portion of the second abutting portion is positioned inside of the molded motor.

7. The molded motor according to claim 1, wherein a front-end portion of the second abutting portion is positioned in an internal space of the molded motor, the internal space being defined by the bracket and the case.

8. The molded motor according to claim 1, wherein an end of the bracket is embedded in the molding resin.

9. The molded motor according to claim 1, wherein the front-end portion of the first abutting portion has an arc shape along the outer side of the cylinder portion of the bearing house.

10. The molded motor according to claim 1, wherein the protrusion is positioned at more radially outer side than the first abutting portion.

11. A molded motor comprising:
a stator including a bottomed cylindrical case molded with a molding resin;
a rotor rotatably disposed on a radially inner side of the stator;
a bearing supporting an output side and a counter-output-side of an output rotary shaft of the rotor;
a conductive bracket including a bearing house housing the bearing and disposed on each of the output side and the counter-output side of the case; and a metal conductive plate electrically connecting the bracket on the output side and the bracket on the counter-output side, wherein:

the conductive plate includes a first abutting portion formed on one end, the first abutting portion comprising a front-end portion that is abutted on an outer side of a cylinder portion of the bearing house on the output side or the counter-output side, the front-end portion warping in a direction away from the case, a second abutting portion formed on the other end and abutted on an inner side of the bracket on the output side or the counter-output side press-fitted on the case, and a conductive sleeve connecting the first abutting portion and the second abutting portion;

the conductive plate and the case include a holding unit for holding the front-end portion of the first abutting portion in a state in which the front-end portion is bent to be raised toward obliquely upward and is abutted on the outer side of the cylinder portion of the bearing house;

the conductive plate is disposed on an outer surface of the case;

the holding unit includes a first holding portion in the conductive plate and a second holding portion in the case;

the first holding portion includes a convex portion formed in the conductive plate by forming a bent portion in the conductive sleeve on the radially outer side of the first abutting portion;

the second holding portion includes a first groove portion including a stepped portion that is a part of the case, the stepped portion facing a side of the bearing house and being positioned at more radially outer side than the bearing house; and the convex portion is inserted in the first groove portion such that the state in which the front-end portion is abutted on the outer side of the cylinder portion of the bearing house is held.

12. The molded motor according to claim 11, wherein the case includes a second groove portion housing the conductive plate.

13. The molded motor according to claim 12, wherein the second groove portion has a depth greater than a thickness of the conductive plate.

14. The molded motor according to claim 12, wherein the second abutting portion includes a cut-raised portion cut and raised in such a manner as to protrude from the second groove portion toward the radially outer side of the case.

15. The molded motor according to claim 11, wherein the first abutting portion has a width smaller than a width of the conductive sleeve.

16. A molded motor comprising:

a stator including a bottomed cylindrical case molded with a molding resin;

a rotor rotatably disposed on a radially inner side of the stator;

a bearing supporting an output side and a counter-output-side of an output rotary shaft of the rotor;

a conductive bracket including a bearing house housing the bearing and disposed on each of the output side and the counter-output side of the case; and a metal conductive plate electrically connecting the bracket on the output side and the bracket on the counter-output side, wherein:

the conductive plate includes a first abutting portion formed on one end, the first abutting portion comprising a front-end portion that is abutted on an outer side of a cylinder portion of the bearing house on the output side or the counter-output side, the front-end portion warping in a direction away from the case, a second abutting portion formed on the other end and abutted on an inner side of the bracket on the output side or the counter-output side press-fitted on the case, and a conductive sleeve connecting the first abutting portion and the second abutting portion;

the conductive plate and the case include a holding unit for holding the front-end portion of the first abutting portion in a state in which the front-end portion is bent to be raised toward obliquely upward and is abutted on the outer side of the cylinder portion of the bearing house;

the conductive plate is disposed on an outer surface of the case;

the holding unit includes a first holding portion formed in the conductive plate and a second holding portion formed in the case;

the state in which the front-end portion is abutted on the outer side of the cylinder portion of the bearing house is held by the first holding portion being press-fitted in the second holding portion; and the first abutting portion has a width smaller than a width of the conductive sleeve.

* * * * *